US009766662B2

(12) United States Patent
Smith et al.

(10) Patent No.: US 9,766,662 B2
(45) Date of Patent: Sep. 19, 2017

(54) CONDUCTIVE GASKET FOR A PORTABLE COMPUTING DEVICE

(71) Applicant: Apple Inc., Cupertino, CA (US)

(72) Inventors: Brandon S. Smith, Scotts Valley, CA (US); Thomas R. Tate, San Jose, CA (US); Mark A. Salvador, Fremont, CA (US); Alexander C. Calkins, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 61 days.

(21) Appl. No.: 14/693,814

(22) Filed: Apr. 22, 2015

(65) Prior Publication Data

US 2016/0313767 A1     Oct. 27, 2016

(51) Int. Cl.
*H05K 9/00* (2006.01)
*G06F 1/16* (2006.01)
*H01Q 1/52* (2006.01)
*H01Q 1/22* (2006.01)

(52) U.S. Cl.
CPC .......... *G06F 1/1656* (2013.01); *G06F 1/1681* (2013.01); *G06F 1/1698* (2013.01); *H01Q 1/2266* (2013.01); *H01Q 1/526* (2013.01)

(58) Field of Classification Search
CPC .... G06F 1/1656; G06F 1/1681; G06F 1/1698; H01Q 1/2258; H01Q 1/526
USPC ........................................ 361/816, 818, 799
See application file for complete search history.

(56) References Cited

U.S. PATENT DOCUMENTS

| 2,454,567 | A |   | 11/1948 | Pierson |            |
|-----------|---|---|---------|---------|------------|
| 4,980,223 | A | * | 12/1990 | Nakano  | B32B 15/08 |
|           |   |   |         |         | 174/36     |
| 5,522,602 | A |   | 6/1996  | Kaplo et al. | |
| 6,512,681 | B2|   | 1/2003  | Uusimäki | |
| 8,203,083 | B2| * | 6/2012  | Song    | H05K 9/0086 |
|           |   |   |         |         | 174/354    |
| 8,369,097 | B2| * | 2/2013  | Murakami | G06F 1/1683 |
|           |   |   |         |         | 361/752    |
| 9,203,137 | B1| * | 12/2015 | Guterman | H01Q 1/2266 |

(Continued)

FOREIGN PATENT DOCUMENTS

EP              275171 A2    3/1995

Primary Examiner — Hung S Bui
(74) Attorney, Agent, or Firm — Downey Brand LLP

(57) ABSTRACT

A shield feature and method of forming to prevent transmission of electromagnetic radiation is disclosed. The shield feature may include a first protrusion and a second protrusion, both of which are formed from an electrically conductive material. A non-electrically conductive material may cover the electrically conductive material in certain regions. The first protrusion, the second protrusion, and an extension between the first protrusion and the second protrusion are free of non-electrically conductive material, allowing the electrically conductive material to engage an enclosure of an electronic device. Also, a distance separates the first protrusion and the second protrusion that is less than a distance defined by a wavelength of the electromagnetic radiation, allowing the shield feature to prevent the electromagnetic radiation from passing through the shield feature. Also, the shield feature may further form an electrical grounding path for an internal component to electrically ground the internal component with the enclosure.

19 Claims, 15 Drawing Sheets

(56) References Cited

U.S. PATENT DOCUMENTS

2009/0116208 A1* 5/2009 Hekkala ............... H05K 9/0037
361/816
2011/0169770 A1* 7/2011 Mishina ................ G06F 1/1656
345/174

* cited by examiner

CONDUCTIVE GASKET FOR A PORTABLE COMPUTING DEVICE

FIELD

The described embodiments relate generally to an electronic device. In particular, the present embodiments relate to an electromagnetic shielding feature to shield internal components within the electronic device from emanating electromagnetic radiation thereby reducing or prevent unwanted electromagnetic interference.

BACKGROUND

Electronic devices are known to include wireless communication devices to establish wireless communication via electromagnetic radiation with external devices. For example, a portable computing device (such as a laptop) can include wireless communication devices such as a WiFi radio circuit used to establish a wireless Internet communication and/or a Bluetooth radio circuit used to establish a wireless communication with an accessory (such as a mouse). The wireless communication devices may include an antenna to transmit and receive certain radio frequencies. As a result, the wireless transmission may cause interference with other internal components of the portable computing device.

One method of shielding the wireless transmission includes a sponge-like foam material formed from a conductive material. However, the foam material may include a nonmatching appearance as compared to the appearance of structural features surrounding the foam material. As a result, the foam material intended only for functional use may nonetheless be visible, which is generally undesirable. Another solution is to use a solid material formed from a conductive material and having a uniform density, unlike the foam material. However, the solid material, when disposed between two housing structures of the electronic device, may be too rigid and therefore less likely to compress. As a result, one of the housing structures may deform or bow, which is also undesirable. Further, as the housing structures become thinner, their ability to resist deformation decreases.

SUMMARY

In one aspect, an electronic device is described. The electronic device may include an electrically conductive enclosure. The electronic device may further include an internal component disposed within the enclosure. In some embodiments, the internal component generates electromagnetic radiation. The electronic device may further include an antenna. The electronic device may further include a shield feature configured to shield the antenna from the electromagnetic radiation generated by the internal component. The shield feature may include an electrically conductive material engaging the enclosure. The shield feature may further include a non-electrically conductive material surrounding the electrically conductive material.

In another aspect, a shield feature for preventing transmission of electromagnetic radiation is described. The shield feature may include a first layer may include an electrically conductive material. The first layer may further include a first protrusion that includes a first tip region. The first layer may further include a second tip region. In some embodiments, the second protrusion may be separated from the first protrusion by a distance less than a wavelength of the electromagnetic radiation. The shield feature may further include second layer covering the first protrusion except for the first tip region. The second layer may further cover the second protrusion except for the second tip region.

In another aspect, a method for forming a shield feature suitable for preventing electromagnetic radiation from interfering with a component of an electronic device is described. The method may include forming a first protrusion, a second protrusion, and a base portion from a first layer of material that includes an electrically conductive material. The method may further include applying a second layer of material to the first protrusion, the second protrusion, and the base portion. The second layer may include a non-electrically conductive material. The method may further include removing a portion of the second layer of material to expose a first tip region of the first protrusion and a second tip region of the second protrusion.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to shield features disposed in an electronic device and used to prevent passage of electromagnetic radiation to an internal component of the electronic device. The shield features may be referred to as conductive gaskets formed from a compressible material that is also electrically conductive. The compressibility of the shield features prevents unwanted deformation or bowing of a structure with the shield features are engaged.

Figure 1:
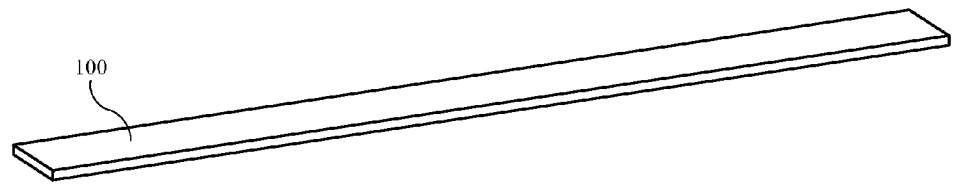
FIG. 1 illustrates an isometric view of a traditional shield feature.
Figure 2:
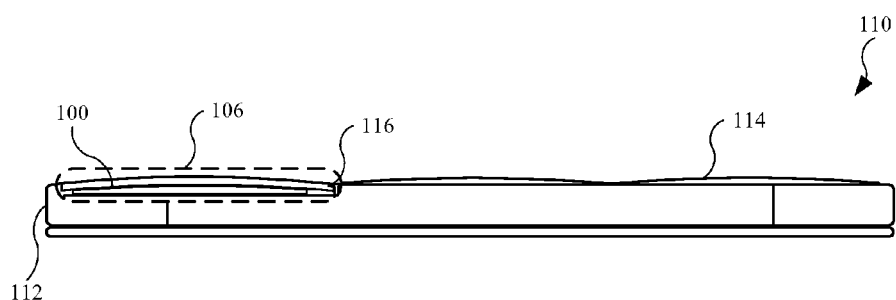
FIG. 2 illustrates a side view of an electronic device having several traditional shield features disposed in the electronic device.

Traditional shield features used in electronic device have certain setback. For example, FIG. 1 illustrates an isometric view of a traditional shield feature 100. As shown, the traditional shield feature 100 may include electrically conductive material and further include a uniform density. FIG. 2 illustrates a side view of an electronic device 110 having several traditional shield features disposed in the electronic device 110. The partial cross sectional view 106 shows the traditional shield feature 100 in the electronic device 110. The electronic device 110 includes a top case 112 and a bottom case 114 secured with the top case 112 by a fastener 116. Ideally, an exterior surface of the bottom case 114 defines a generally planar surface. However, due to the rigidity and relative incompressibility of the traditional shield features disposed between fasteners, the bottom case 114 deforms, or bows, in locations associated with the traditional shield features. As a result, the exterior surface of the bottom case 114 is generally non-linear and extends beyond a planar surface.

In the following disclosure, a shield feature that forms part of a Faraday cage, or electromagnetic radiation shield, for an electronic device is described. The shield feature may include a base region having several protrusions. In some cases, these protrusions may include a conical shape. Also, each of the protrusions may include a hollow region that allows the protrusions to deform in response to a force exerted on the protrusions. For example, the protrusions allow a bottom case engaging the protrusions and coupled with the top case to deform the protrusions rather than deform the bottom case.

Also, the base region and the protrusions may include an electrically conductive material, such as a conductive silicone, to define an electrically conductive layer. Also, the electrically conductive material may initially be in liquid form and molded to a desired shape and size. Further, the electrically conductive material may undergo a compression molding by disposing the electrically conductive material in a mold cavity that defines a desired shape of at least a portion of the shield feature. In some embodiments, the mold cavity is heated and pressure is applied to the electrically conductive material to force the electrically conductive material to the various regions of the mold cavity. However, other molding techniques may include, but are not limited to, injection molding and pouring the liquid material into a mold cavity. The shield feature may further include a non-electrically conductive material, such as a non-conductive silicone, disposed over the electrically conductive material to define a non-electrically conductive layer. The non-electrically conductive layer may also be referred to as an electrically insulating layer. The non-electrically conductive material may be applied by spraying the non-electrically conductive material onto the electrically conductive material. Also, the non-conductive silicone may include a relatively dark color, including black. This allows the shield feature to be less visible to a user when the shield feature is disposed near an opening of the electronic device.

Some of the non-electrically conductive layer may be removed. For example, each of the protrusions may include a tip region that does not include the non-electrically conductive material. In some cases, a mask or template is placed over locations associated with the tip regions. After the non-electrically conductive layer is applied, the mask or template be removed to expose the tip regions which are formed from the electrically conductive layer. The tips regions are designed to contact an enclosure (such as a bottom case) of an electronic device. The enclosure may include one or more structures formed from a metal, such as aluminum. Also, if additional portions of the non-electrically conductive layer should be removed, a laser tool can laser ablate these areas to remove the additional portions. This allows the protrusions, which may deform when a force is applied to the tip regions, to nonetheless be in contact with the enclosure.

Also, opposite the tip regions, the electrically conductive layer may include several extensions, each of which may be located between adjacent protrusions. Each extension is designed to contact another structure of the enclosure, such as a top case. Also, in some cases, the shield feature includes an adhesive layer used to secure the shield feature one of the enclosure structures, such as the top case. The extensions may be further designed to extend beyond the adhesive layer to contact the top case. In this manner, the shield feature may extend from the bottom case to the top case.

Electronic device may include one or more internal components, such as an integrated circuit used to perform one or more functions in the electronic device. These internal components are known to generate electromagnetic radiation, or "noise," which may interfere with other components of the electronic device, such as antenna. However, when one or more shield features are positioned between the antenna and a noise-generating internal component disposed in the enclosure, the one or more shield features may combine with the top case and the bottom case to define a Faraday cage enclosing the noise-generating internal component, and the antenna remains un-interfered with by the noise-generating internal component. In other words, electromagnetic radiation from the internal component does not cause electromagnetic interference with the antenna.

The protrusions are designed such that adjacent protrusions are positioned at a pitch, or distance, that is substantially less than a wavelength of the electromagnetic radiation. For example, a WiFi integrated radio circuit used for establishing a wireless Internet connection may transmit radio frequencies at approximately 5 GHz with a corresponding wavelength of approximate 12.5 centimeters. In some embodiments, the pitch between adjacent protrusions is 10 millimeters or less, which is significantly less than the wavelength of the radio frequencies associated with WiFi communication. Further, when the protrusions are deformed in response to the force applied to the protrusions, the pitch may change. Nonetheless, the pitch is significantly less than that of the wavelength of the radio frequencies associated with WiFi communication. Various mold cavities or injection molding apparatuses can be used to form a shield feature with a different pitch. Also, the pitch between adjacent protrusions may be adjusted to prevent different frequencies, greater than or less than 5 GHz, from extending through the shield feature. Alternatively, if it is desired that radio frequencies of a first frequency range pass through the shield feature and radio frequencies of a second frequency do not pass through the shield feature, the shield feature may be design such that the pitch between adjacent protrusions is greater than a wavelength associated with the first frequency but significantly less than a wavelength associated with the second frequency.

In addition to providing an electromagnetic shield, the shield feature, when in contact with the enclosure of the electronic device, can also be used as an electrical grounding pathway for one or more internal components in the electronic device. For example, the electronic device may include one or more internal components, such as an integrated circuit, each of which may include an electrical potential. Accordingly, the internal components include a relatively high frequency which may cause electromagnetic noise. However, when the internal components are electrically connected to the shield feature (or if each internal component is electrically connected to discrete shield features), the shield feature (or features) may provide an electrical grounding pathway for the internal components to the metal enclosure.

These and other embodiments are discussed below with reference to FIGS. 3-24. However, those skilled in the art will readily appreciate that the detailed description given herein with respect to these Figures is for explanatory purposes only and should not be construed as limiting.

Figure 3:
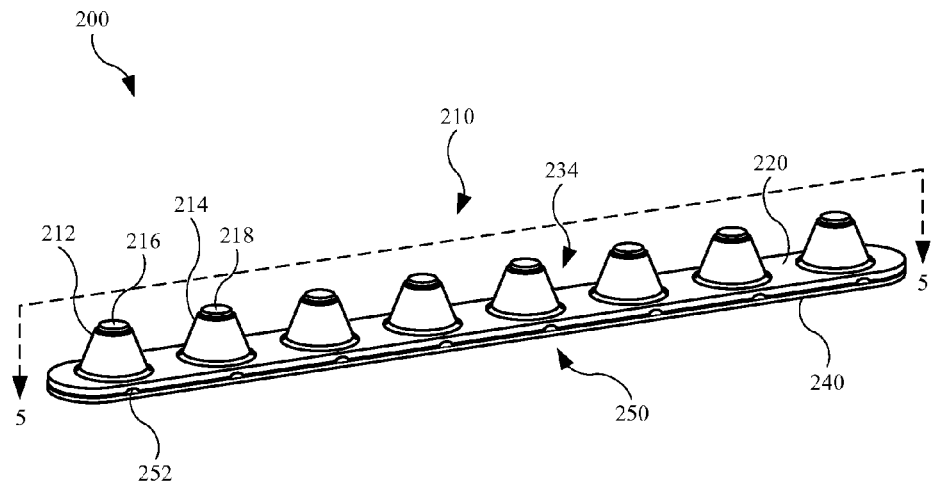
FIG. 3 illustrates an isometric top view of a shield feature, in accordance with the described embodiments.

FIG. 3 illustrates an isometric top view of a shield feature 200, in accordance with the described embodiments. The shield feature 200, as shown, includes protrusions 210, such as a first protrusion 212 and a second protrusion 214 (both of which may be representative of the remaining protrusions), disposed on a base portion 220, with the base portion 220 surrounding the protrusions 210. Each protrusion may include a tip region. For example, the first protrusion 212 includes a first tip region 216 and the second protrusion 214 includes a second tip region 218. Although the protrusions 210 as shown include a discrete number, in other embodiments, the protrusions 210 include nine or more protrusions. Alternatively, in some embodiments, the protrusions 210 include seven or less protrusions. The protrusions 210 may take on several various shapes. However, in the embodiment shown in FIG. 3, the protrusions 210 generally include a conical shape that increase in diameter from the tip region to the base portion 220.

The shield feature 200 may be formed from several layers of material. For example, in some embodiments, shield feature 200 includes a first layer and a second layer 234 disposed over the first layer. Also, in some embodiments, the first layer is formed from an electrically conductive material, such as a conductive silicone. The silicone may be electrically conductive by infusing small conductive particles, such as metal, into the silicone. The conductive material may be initially in liquid form and molded to a desired size and shape. Also, the electrically conductive layer may define the general shape of the shield feature 200. This will be discussed below. The tip regions may be formed from the first layer, and accordingly, each tip region may be electrically conductive.

In some embodiments, the second layer 234 is an insulating or non-electrically conductive layer, such as a non-electrically conductive silicone. The second layer 234 may disposed on the first layer by spraying, molding, or other means generally known in the art for applying silicone-based materials.

The shield feature 200 may further include an adhesive layer 240. In some embodiments, the adhesive layer 240 is formed from an electrically conductive material. In the embodiment shown in FIG. 3, the adhesive layer 240 is formed from a non-electrically conductive material, such as a non-electrically conductive pressure sensitive adhesive. This prevents an increase in electrical resistance when the shield feature 200 is disposed in an electronic device. Also, the shield feature 200 may include vents 250, with each of protrusions 210 having a vent. For example, the first protrusion 212 includes a first vent 252. The first protrusion 212 may include a hollow region (not shown) and the first vent 252 allows air to flow out of the hollow region to avoid pressure increases within the hollow region. This also facilitates compressibility of the protrusions 210.

Figure 4:
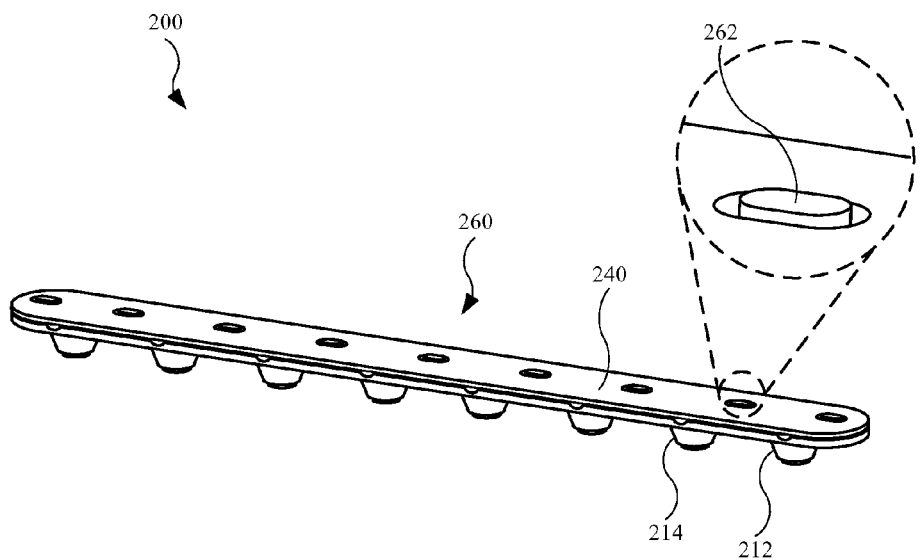
FIG. 4 illustrates an isometric bottom view of the shield feature shown in FIG. 3.

FIG. 4 illustrates an isometric bottom view of the shield feature 200 shown in FIG. 3. The shield feature 200 may include extensions 260 formed from the first layer of material, and accordingly, each of the extensions may be an electrically conductive extension, or electrode. Also, the first layer may extend from the tip regions (shown in FIG. 3) to the extensions 260 such that the shield feature 200 includes electrically conductive material from end to end. As shown in the enlarged view, the extensions 260 include a first extension 262 (representative of the remaining extensions) that extends beyond the adhesive layer 240. This ensures the first extension 262 engages a structure with which the shield feature 200 is secured (such as a top case of an enclosure). Several of the extensions 260 are located between adjacent protrusions. For example, the first extension 262 is located between the first protrusion 212 and the second protrusion 214.

Figure 5:
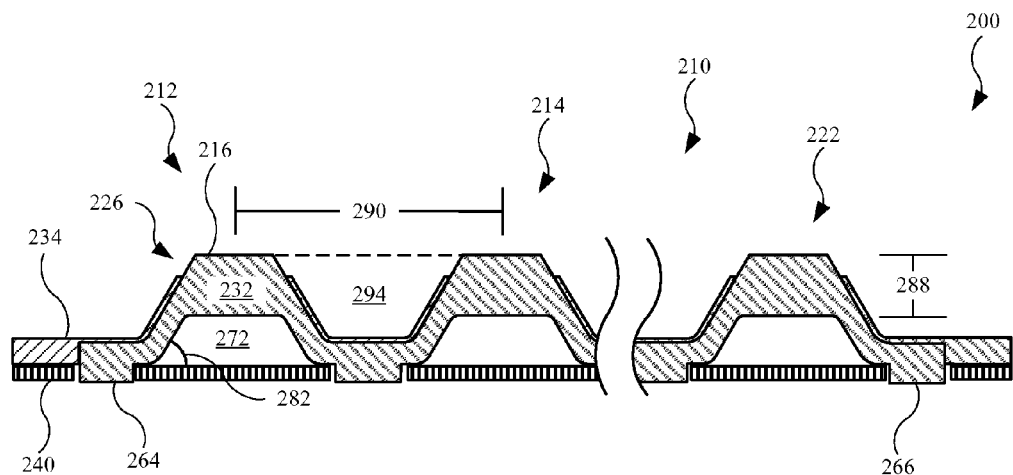
FIG. 5 illustrates a cross sectional view of the shield feature shown in FIG. 3 taken along line 5-5.

FIG. 5 illustrates a cross sectional view of the shield feature 200 shown in FIG. 3 taken along line 5-5. As shown, the first layer 232 may define the protrusions 210, the tip regions and the extensions. Also, the first layer 232 extends from first end extension 264 to the second end extension 266. The second layer 234 may be at least partially disposed over the first layer 232. In some embodiments, the second layer 234 is dark including a black color, and accordingly, the shield feature 200 may be less visible to a user when the shield feature 200 is disposed in an electronic device. The second layer 234 may undergo a material removal process to remove a portion of the second layer 234 from the tip regions. For example, as shown, below the first tip region 216 of the first protrusion 212 is a first exposed region 226 of the first layer 232, with the first exposed region 226 extending around the first tip region 216. This ensures contact between the enclosure and the first tip region 216 and/or the first exposed region 226. This will be shown and discussed below.

Each of the protrusions 210 may include a hollow region that includes a vent. For example, the first protrusion 212 includes a first hollow region 272 defined as a space or void between the first protrusion 212 and the adhesive layer 240. Also, the first hollow region 272 may open to the first vent 252 (shown in FIG. 4). The first hollow region 272 allows the shield feature 200 to compress when a force is applied to the first tip region 216 of the first protrusion 212. Further, the conical shape of the first protrusion 212 defines a first angle 282 that allows the first protrusion 212 to include a lower compressibility force required to compress the first protrusion 212. In order to further manipulate the compressibility, the thickness of the protrusion may be increases or decreased. For example, FIG. 5 shows a third protrusion 222 having a thickness 288 representative of a thickness of the protrusions 210. If the thickness 288 is increased, the compressibility force required to deform the third protrusion 222 increases while a thickness 288 that is decreased corresponds to a lesser compressibility force required to deform the third protrusion 222.

Also, a pitch defined by a separation between adjacent protrusions may uniformly separate the protrusions 210. For example, a pitch 290 separates the first protrusion 212 from the second protrusion 214. In some embodiments, the pitch 290 is less than 10 millimeters. Further, in some embodiments, the pitch is less than 4 millimeters. The pitch 290, representative of the pitch between remaining adjacent protrusions, is a distance significantly less than a wavelength of certain electromagnetic radiation. This allows the shield feature 200 (or one or more shield features) to form at least part of a Faraday cage for internal components of an electronic device. In this manner, electromagnetic radiation transmitted at 2.4 GHz (with an associated wavelength of approximately 12.5 centimeters), and even electromagnetic radiation transmitted at 5 GHz (with an associated wavelength of approximately 6 centimeters) is unable to pass or extend through the shield feature 200. In some embodiments, the pitch 290 decreases to prevent electromagnetic radiation with higher frequencies from passing through the shield feature 200. However, in other embodiments, the pitch 290 is altered to allow electromagnetic radiation transmitted at some frequencies to pass but not other frequencies.

FIG. 5 further shows a gap 294 defined as a space or void between adjacent protrusions and further defined between an imaginary line extending between the first protrusion 212 and the second protrusion 214. It will be appreciated that the gap 294 includes a size and a shape designed to prevent transmission of unwanted electromagnetic radiation.

Figure 6:
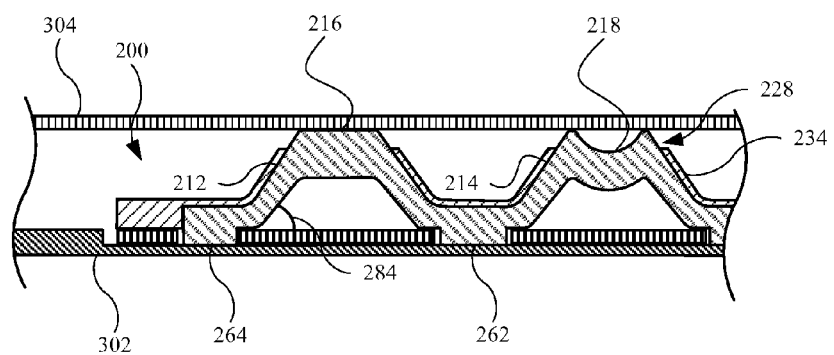
FIG. 6 illustrates a cross sectional view of the shield feature disposed between two substrates that form an enclosure or housing of an electronic device.

FIG. 6 illustrates a cross sectional view of the shield feature 200 disposed between two substrates that form part of an enclosure or housing of an electronic device. The enclosure may include a first substrate 302 and a second substrate 304. In some embodiments, the first substrate 302 is a top case of an electronic device, and the second substrate 304 is a bottom case of an electronic device. Also, the first substrate 302 and the second substrate 304 may be formed from a metal, such as aluminum. This will be discussed below. As shown, the shield feature 200 is adhesively secured with the first substrate 302 via the adhesive layer 240. Also, the first extension 262 and the first end extension 264 engage the first substrate 302 while the first tip region 216 of the first protrusion 212 engages the second substrate 304. However, the second substrate 304 applies a force to the first protrusion 212 causing the first protrusion 212 to compress such that the first protrusion includes a second angle 284 less than the first angle 282 (shown in FIG. 5). In this manner, the first protrusion 212 deforms, and the second substrate 304 does not deform or bow to remain generally flat.

Although the protrusions are designed to compress, in some cases, the tip region may become at least partially disengaged from the second substrate 304. For example, when the second protrusion 214 is compressed, the second tip region 218 becomes at least partially disengaged with the second substrate 304. However, because the second layer 234 includes a material removal process which defines a second exposed region 228 that extends around the second tip region 218, the second protrusion 214 remains engaged with the second substrate 304 and functionality of the shield feature 200 is not compromised.

Figure 7:
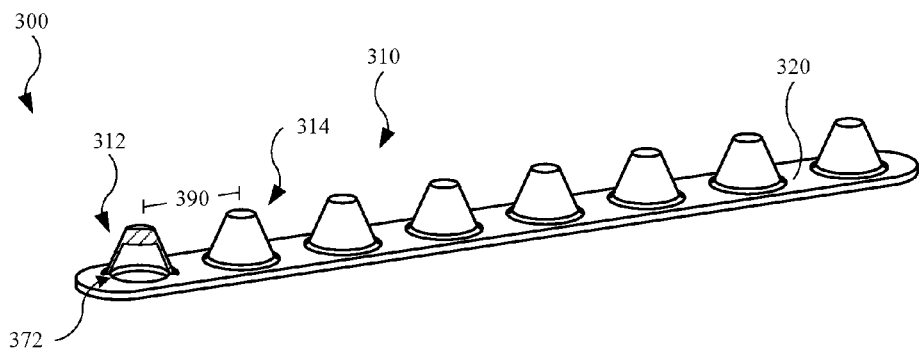
FIG. 7 illustrates a top isometric view of a first layer of an embodiment of a shield feature, in accordance with the described embodiments.

FIGS. 7-12 illustrates the steps for forming a shield feature. FIG. 7 illustrates a top isometric view of a first layer 332 of an embodiment of a shield feature 300, in accordance with the described embodiments. As shown, the first layer 332 may define protrusions 310 integrally formed with a base portion 320. The phrase "integrally formed" as used throughout this detailed description and in the claims refers to two or more structures formed from as a single, unitary structure. For example, in some embodiments, the first layer 332 is formed from a silicone material initially in a liquid form and molded in a mold cavity or an injection molding tool. This also allows the first layer 332 to be formed from various shapes and sizes. Also, in some embodiments, the silicone is an electrically conductive silicone. Also, as shown, the base portion 320 extends around the protrusions 310. In addition to the conductive material forming the basic structure of the protrusions 310, the conductive material of the base portion 320 may allow for additional shielding of electromagnetic radiation.

A partial cross sectional view of a first protrusion 312, representative of the remaining protrusion, shows a first hollow region 372 within the first protrusion 312. Based upon the molding of the first layer 332, a pitch between adjacent protrusions may be defined. For example, the pitch 390 is shown in FIG. 7 between the first protrusion 312 and a second protrusion 314 adjacent to the first protrusion 312. The pitch 390 may be any distance previously described for a pitch and accomplish one or more of the functionalities previously described. For example, the pitch 390 may be substantially less than a wavelength of electromagnetic radiation.

Figure 8:
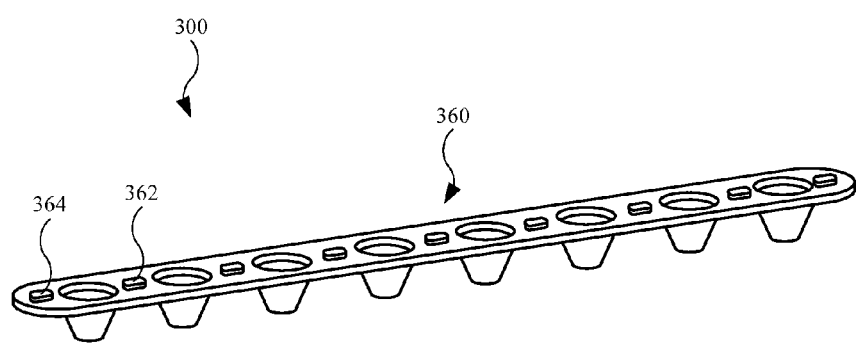
FIG. 8 illustrates a bottom isometric view of the shield feature in FIG. 7, showing the extensions formed from the first layer.

FIG. 8 illustrates a bottom isometric view of the shield feature 300 in FIG. 7, showing the extensions 360 formed from the first layer 332. Accordingly, the extensions 360, which include the first extension 362 and the first end extension 364, may also be molded in a manner previously described and also formed from a conductive material, such as conductive silicone.

Figure 9:
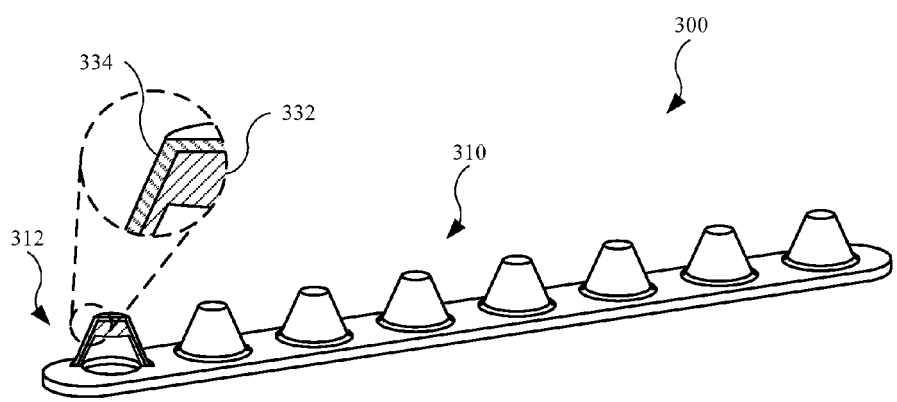
FIG. 9 illustrates an isometric view of the first layer of the shield feature shown in FIG. 7, with a second layer disposed on the first layer.

FIG. 9 illustrates an isometric view of the first layer 332 of the shield feature 300 shown in FIG. 7, with a second layer 334 disposed on the first layer 332. In some embodiments, the second layer 334 is molded onto the first layer 332. In the embodiment shown in FIG. 3, the second layer 334 is sprayed onto the first layer 332. Also, in some embodiments, the second layer 334 is formed from silicone. Also, in some embodiments, the second layer 334 is a non-electrically conductive silicone. Further, in some embodiments, the second layer 334 includes a dark color, including a black color. The second layer 334 generally covers the entire exterior surface of the first layer 332, including the protrusions 310 and the base portion 320 (shown in FIG. 7). In the enlarged view of FIG. 9 showing the partial cross section, the first protrusion 312 includes the first layer 332 covered by the second layer 334.

Figure 10:
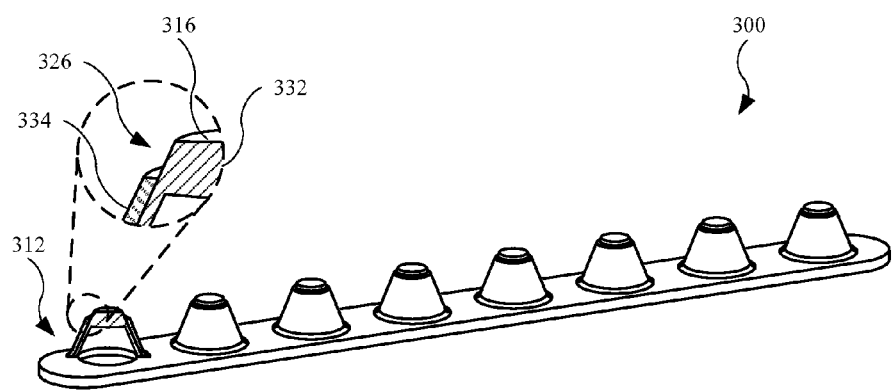
FIG. 10 illustrates an isometric view of the shield feature shown in FIG. 9, with a portion of the second layer removed.

FIG. 10 illustrates an isometric view of the shield feature 300 shown in FIG. 9, with a portion of the second layer 334 removed. In some embodiments, a mask or template (not shown) is disposed over the tip regions of the protrusions prior to disposing the second layer 334 over the first layer 332, and then removed to expose the tip regions formed from the first layer 332. In other embodiments, a laser tool (not shown) is used to laser ablate and remove portions of the second layer 334 to expose the tip region. The laser tool may also be used in conjunction with the mask or template. In the enlarged view of FIG. 10 showing the partial cross section, the second layer 334 is removed from the first layer 332 such that the first tip region 316 of the first protrusion 312 and a first exposed region 326 around the first tip region 316 are exposed. In this manner, the first layer 332 is exposed in these locations. It will be appreciated that the remaining protrusions are formed in a manner previously described for the first protrusion 312.

Figure 11:
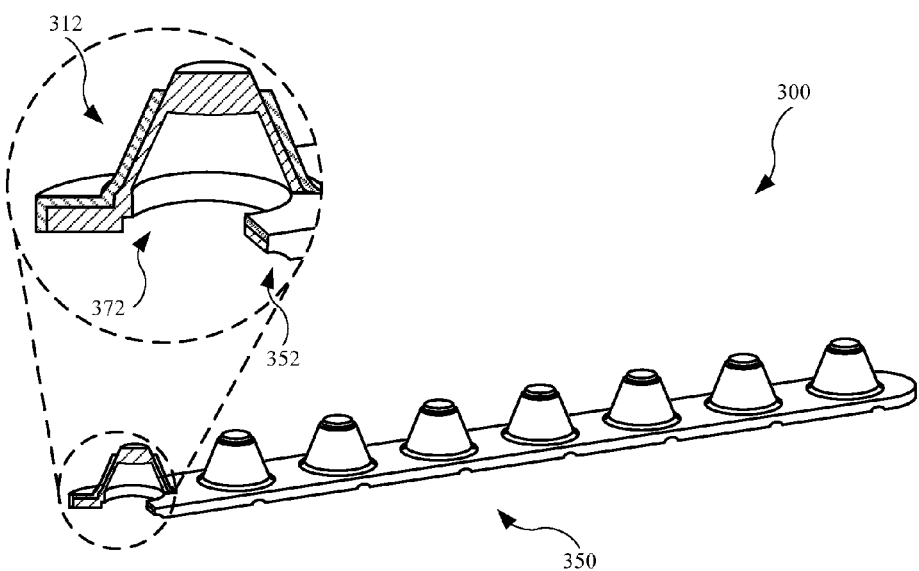
FIG. 11 illustrates an isometric view of the shield feature shown in FIG. 10, with several vents formed and opening into each of the protrusions.

FIG. 11 illustrates an isometric view of the shield feature 300 shown in FIG. 10, with several vents 350 formed and opening into each of the protrusions 310. In the enlarged view showing a partial cross section, the first protrusion 312, representative of the remaining protrusions, includes a first vent 352 that extends from an exterior region of the shield feature 300 to the first hollow region 372 of the first protrusion 312. This allows air to pass from the first hollow region 372 when, for example, a force is applied to the first protrusion 312, thereby allowing the first protrusion 312 to deform.

Figure 12:
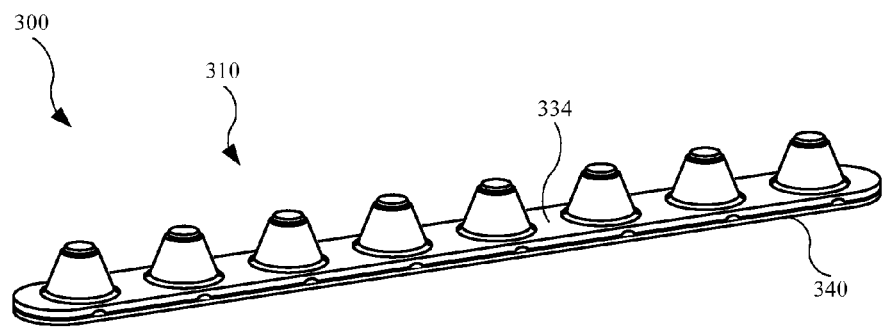
FIG. 12 illustrates an isometric view of the shield feature shown in FIG. 11, showing an adhesive layer secured with at least the first layer.

FIG. 12 illustrates an isometric view of the shield feature 300 shown in FIG. 11, showing an adhesive layer 340 secured with at least the first layer 332 (shown in FIG. 7) and disposed below the second layer 334. The protrusions 310, and in particular the tip regions and the exposes regions, include the first layer 332 extending beyond the second layer 334. Also, the extensions 360 (shown in FIG. 8) extend beyond the adhesive layer 340. This allows the tip regions and the extensions to engage their respective regions of an enclosure of an electronic device.

Figure 13:
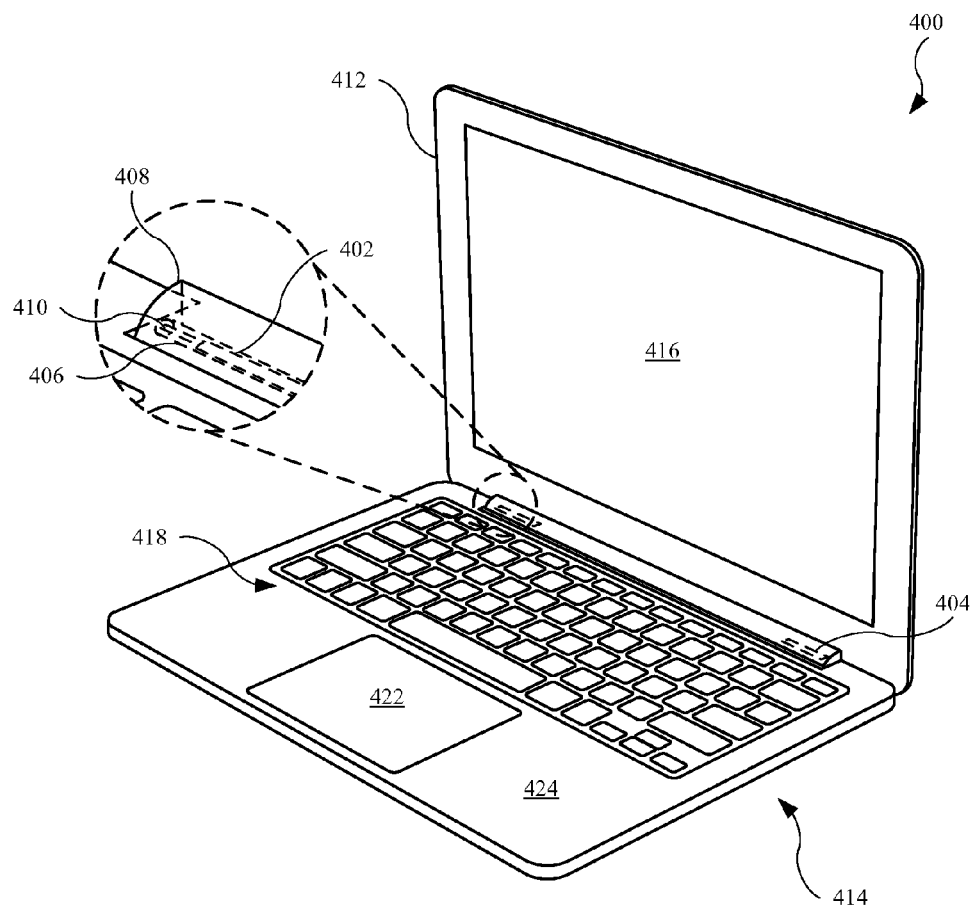
FIG. 13 illustrates an isometric view of an electronic device having a first antenna and a second antenna disposed in a clutch assembly.

FIG. 13 illustrates an isometric view of an electronic device 400 having a first antenna 402 and a second antenna 404 disposed in a clutch assembly 406. In some embodiments, the electronic device 400 is a desktop computing device. In the embodiment shown in FIG. 13, the electronic device 400 is a laptop computing device. As shown, the electronic device 400 includes a lid portion 412 coupled with a base portion 414. The lid portion 412 may include a display 416 designed to display visual content. The base portion 414 may include a keyboard 418 and a touch pad 422, both of which are designed to input one or more gestures to the electronic device 400. Also, the base portion 414 may include a top case 424 coupled with a bottom case (not shown). In some embodiments, the top case 424 and the bottom case are formed from a metal, such as aluminum.

The lid portion 412 may rotate or pivot with respect to the base portion 414 via the clutch assembly 406 and a hinge (not shown). Also, in order to receive the first antenna 402 and the second antenna 404, the clutch assembly 406 is hollow. Further, the clutch assembly 406 is formed from a non-metal material that allows the first antenna 402 and the second antenna 404 to transmit and/or receive electromagnetic radiation. In addition, a cover 408 hiding the first antenna 402, the second antenna 404, and the clutch assembly 406 is also formed from a non-metal material. As shown in the enlarged view, the first antenna 402 includes a cable 410 electrically coupled with the first antenna 402 and extending through the clutch assembly 406 and a hinge to electrically couple with an integrated circuit (not shown) disposed in the base portion 414.

Figure 14:
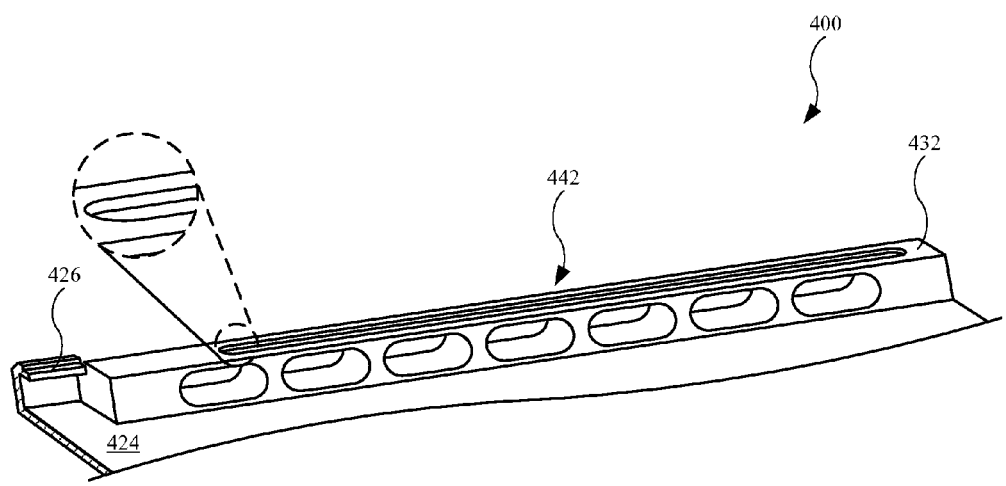
FIG. 14 illustrates a partial isometric view of the electronic device shown FIG. 13, showing an interior region having a vent structure with a recessed region designed to receive a shield feature, in accordance with the described embodiments.

FIG. 14 illustrates a partial isometric view of the electronic device 400 shown in FIG. 13, showing an interior region having a vent structure 432 with a recessed region 442 designed to receive a shield feature, in accordance with the described embodiments. The vent structure 432 is located proximate to a ledge feature 426 of the top case 424, with the ledge feature 426 designed to receive a bottom case (not shown). Although not shown, the vent structure 432 may extend further along the top case 424 and designed to receive one or more additional shield features.

Figure 15:
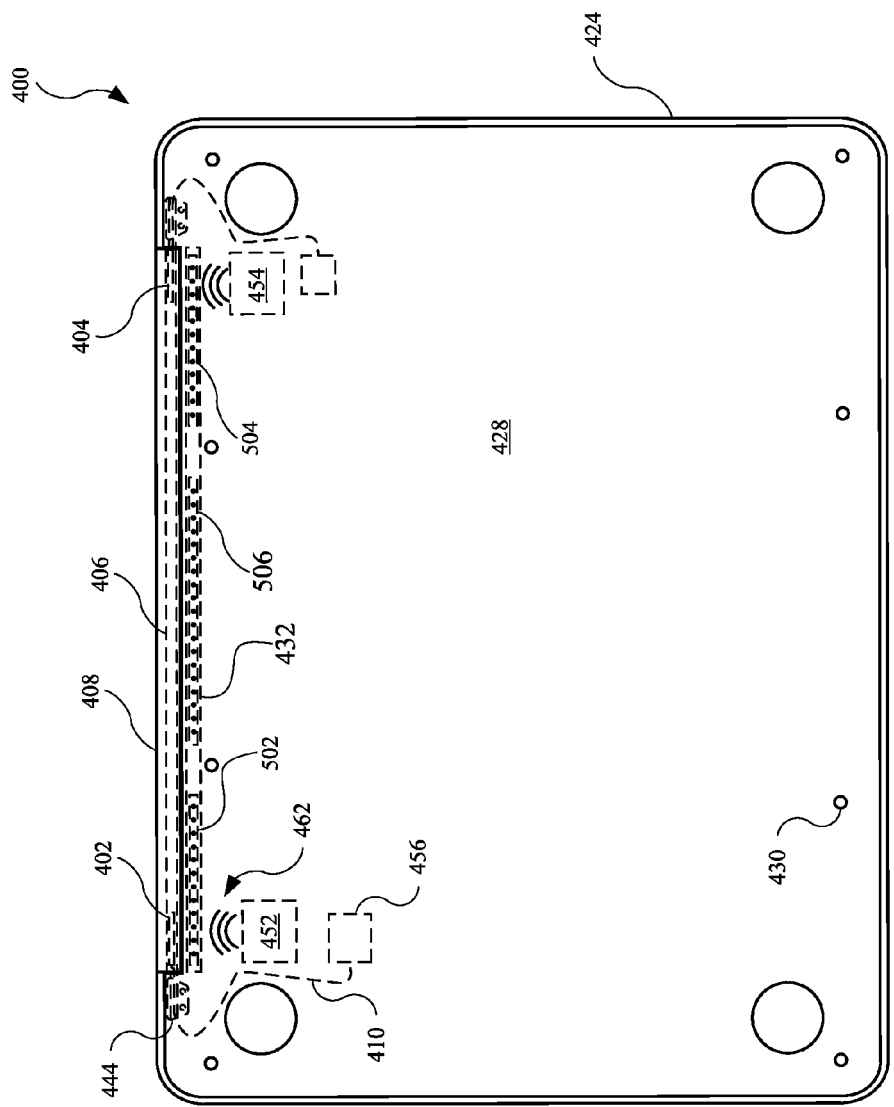
FIG. 15 illustrates plan view of the electronic device shown in FIG. 13, with shield features positioned between the antennas and several internal components of the electronic device.

FIG. 15 illustrates plan view of the electronic device 400 shown in FIG. 13, with shield features positioned between the antennas and several internal components of the electronic device 400, in accordance with the described embodiments. As shown, a first internal component 452 and a second internal component 454 are disposed between the top case 424 and a bottom case 428 coupled with the top case 424. Several fasteners, such as a first fastener 430, secure the top case 424 with the bottom case 428. As shown, the vent structure 432 includes a first shield feature 502, a second shield feature 504, and a third shield feature 506. The vent structure may include recessed regions (similar to the recessed region 442, shown in FIG. 14) for each of the shield features. When coupled with the top case 424, the bottom case 428 engages the first shield feature 502, the second shield feature 504, and the third shield feature 506. In this manner, the top case 424, the bottom case, 428, the first shield feature 502, the second shield feature 504, and the third shield feature 506 combine to define a Faraday case for the internal components of the electronic device 400, which includes the first internal component 452 and the second internal component 454. Accordingly, electromagnetic radiation in the form of radio frequencies generated internally with respect to the Faraday cage do not cause electromagnetic interfere with the components located externally with respect to the Faraday cage.

Figure 16:
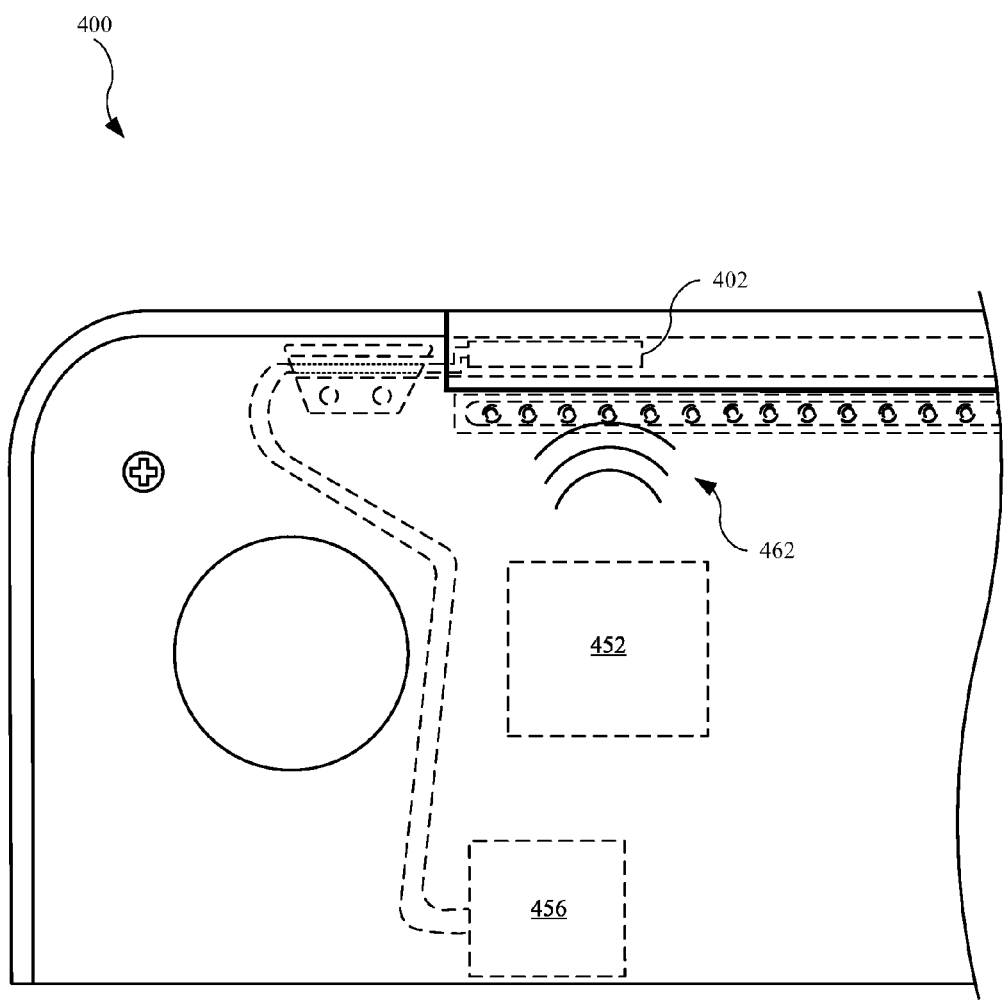
FIG. 16 illustrates an enlarged view of the electronic device shown in FIG. 15, with the first shield feature preventing electromagnetic radiation transmitted by the first antenna from interfering with the first internal component.

FIG. 15 further shows the cover 408, including the first antenna 402 and the second antenna 404 disposed in the clutch assembly 406, located externally with respect to the top case 424, the bottom case 428 and the shield features. The cable 410 of first antenna 402 extends through a hinge 444 and electrically couples with a third internal component 456 which may be, for example, a WiFi integrated radio circuit or a Bluetooth integrated radio circuit. In some embodiments, the first internal component 452 and the second internal component 454 generate electromagnetic radiation capable of generating interference with other components of the electronic device 400. For example, as shown, the first internal component 452 is capable of generating electromagnetic radiation 462 proximate to the first antenna 402. Despite their potential sensitivity to electromagnetic interference, the first antenna 402 and the second antenna 404 are shielded from electromagnetic radiation from the first internal component 452 and the second internal component 454, respectively, due to protection provided in part by the Faraday cage. As an example, FIG. 16 illustrates an enlarged view of the electronic device 400 shown in FIG. 15, with the first shield feature 502 preventing electromagnetic radiation 462 transmitted by the first internal component 452 from interfering with the first antenna 402. In this manner, the first antenna 402 may operate without interference from the electromagnetic radiation 462.

Figure 17:
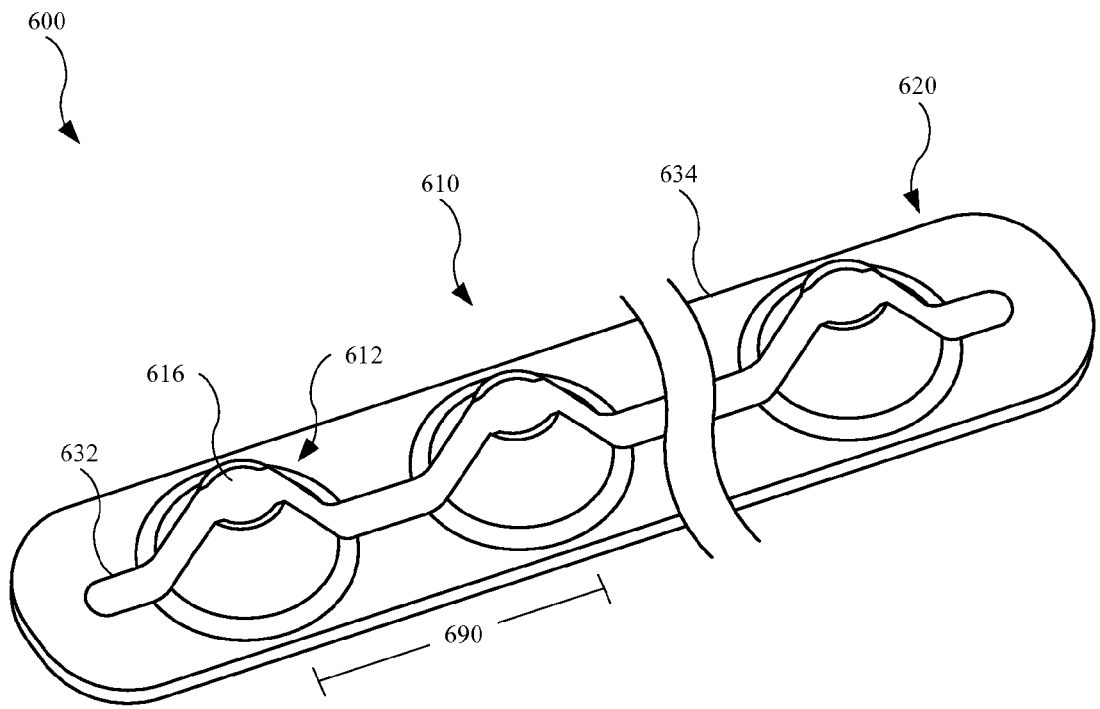
FIG. 17 illustrates a top isometric view of an alternate embodiment of a shield feature, in accordance with the described embodiments.

The shield features may include different configurations. For example, FIG. 17 illustrates a top isometric view of an alternate embodiment of a shield feature 600, in accordance with the described embodiments. The shield feature may include protrusions 610 integrally formed with a base portion 620. As shown, a first layer 632 is surrounded by a second layer 634. In some embodiments, the first layer 632 is formed from an electrically conductive material, such as an electrically conductive silicone. Each of the protrusions 610 includes a tip region, with the first layer 632 extending through each of the tip regions. Accordingly, each of the tip regions may include at least some electrically conductive material. For example, the first protrusion 612 includes a first tip region 616, at least a part of which is formed from the first layer 632. Also, in some embodiments, the second layer 634 is formed from a non-electrically conductive material, such as a non-electrically conductive silicone. Unlike previous embodiments, the base portion 620 is substantially formed by the second layer 634 rather than the first layer 632. However, the shield feature 600 may have other advantages. For example, the material defining the first layer 632 may be conserved. Also, in some cases, the first layer 632 may be co-molded with the second layer 634.

Figure 18:
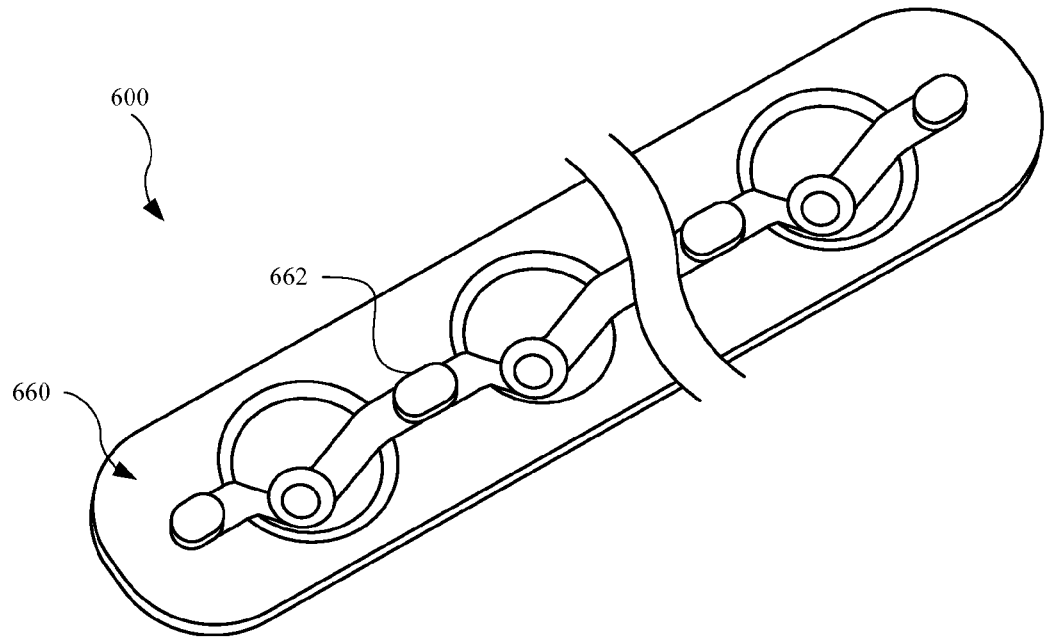
FIG. 18 illustrates a bottom isometric view of the shield feature shown in FIG. 17.

FIG. 18 illustrates a bottom isometric view of the shield feature 600 shown in FIG. 17. As shown, the first layer 632 includes extensions 660, including a first extension 662. The extensions 660 and the tip regions of the protrusions 610 (shown in FIG. 17) are designed to engage an enclosure in a manner previously described for a shield feature. Also, the shield feature 600 is designed to prevent electromagnetic radiation from passing through the shield feature 600. In this manner, the pitch 690 (shown in FIG. 17) is designed to be substantially less than a wavelength of the electromagnetic radiation to be blocked.

Figure 19:
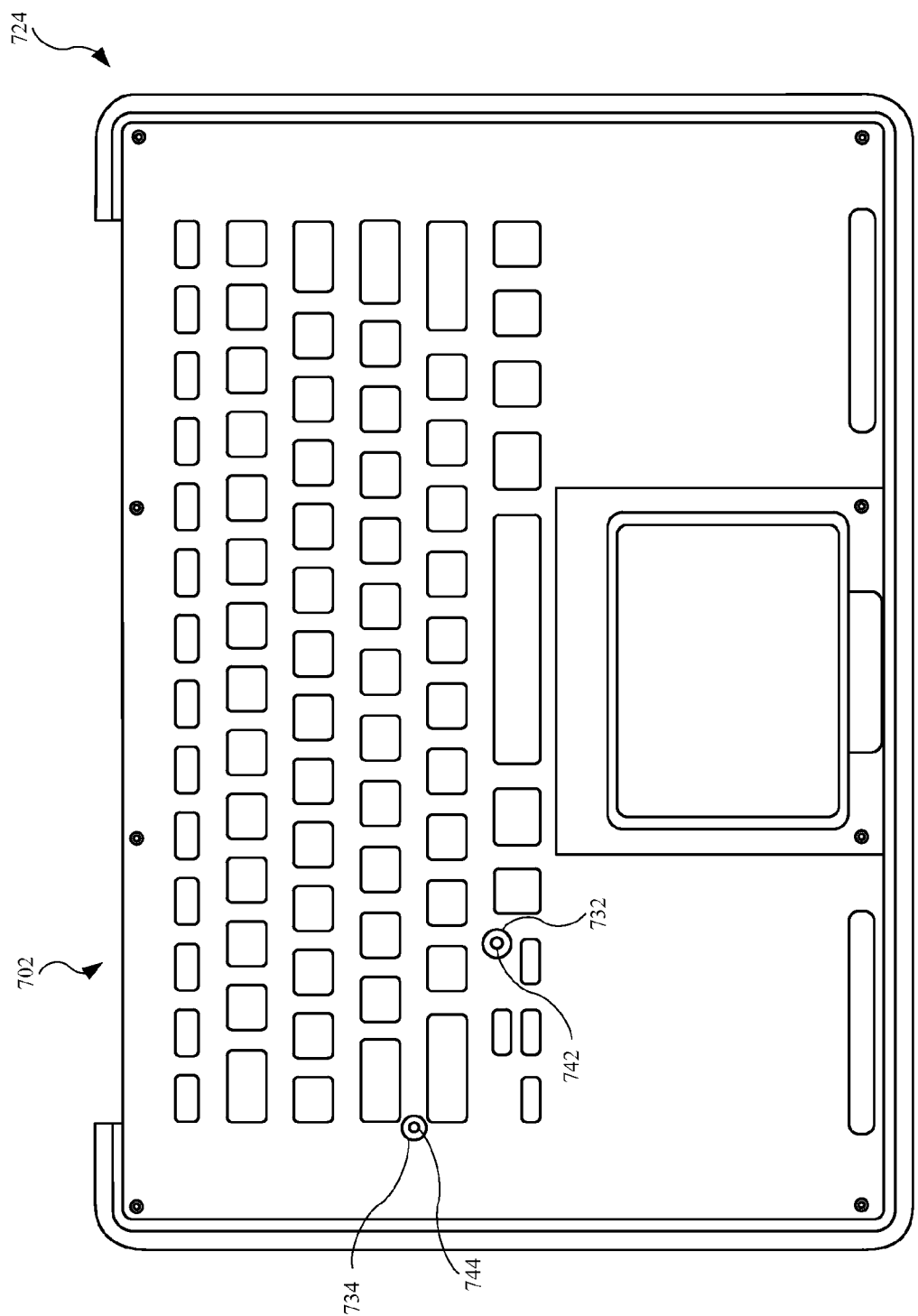
FIG. 19 illustrates a plan view of an interior region of a top case.

FIG. 19 illustrates a plan view of an interior region 702 of the top case 424 of an electronic device. The top case 724 may be substantially similar to, and may include any features of, the top case 424 shown in FIG. 13. As shown, the top case 724 includes a first protruding feature 732 and a second protruding feature 734. Although shown in a particular location of the interior region 702, the first protruding feature 732 and/or the second protruding feature 734 may be located in other regions of the interior region 702. Also, in some embodiments, the interior region 702 includes three or more protruding features.

The first protruding feature 732 and the second protruding feature 734 may include a first internal region 742 and a second internal region 744, respectively. In some embodiments, the first internal region 742 and the second internal region 744 are threaded. In this manner, the first internal region 742 and the second internal region 744 can each receive a threaded fastener designed to secure an internal component (not shown) with the top case 724. However, in some embodiments, the internal component is an integrated circuit, such as a main logic board, that emanates electromagnetic radiation causing interference which may disrupt the functionality of other internal components. In some cases, an RF shield may be disposed between the internal component and a keyboard assembly (not shown) in order to prevent electromagnetic interference with one or more components associated with the keyboard assembly. However, the RF shield may include a number of openings corresponding to the number of protruding features (such as the first protruding feature 732). As such, the openings may create a path for the electromagnetic radiation to extend through the RF shield and interfere with the keyboard assembly components and/or other components.

Figure 20:
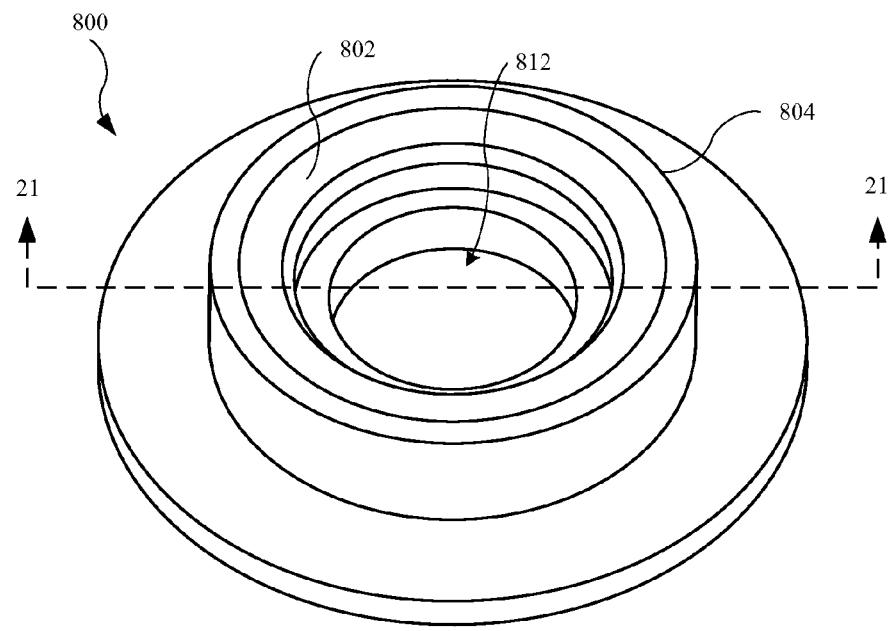
FIG. 20 illustrates an isometric view of an alternate embodiment of a shield feature.

FIG. 20 illustrates an isometric view of an alternate embodiment of a shield feature 800. The shield feature 800 may include an electrically conductive region 802 surrounded by a non-electrically conductive region 804. In some embodiments, the electrically conductive region 802 is formed from an electrically conductive material, such as an electrically conductive silicone previously described. Further, the electrically conductive region 802 may be formed by any process previously described for forming a feature for an electrically conductive material, such as compression molding. Also, the electrically conductive region 802 may further include an opening 812 extending through the electrically conductive region 802 and having a diameter that allows the shield feature 800 to receive, for example, the first protruding feature 732 (shown in FIG. 19). The non-electrically conductive region 804 is designed to provide an electrical insulation layer and as well as enhance the cosmetic appearance of the shield feature 800. Regarding the latter, in some embodiments, the non-electrically conductive region 804 includes a matte, or non-gloss, finish. In some embodiments, the non-electrically conductive region 804 is formed from a non-electrically conductive material, such as non-electrically conductive silicone. Also, the non-electrically conductive region 804 may be applied to the electrically conductive region 802 in any manner previously described for a non-electrically conductive deposition, such as spraying.

Figure 21:
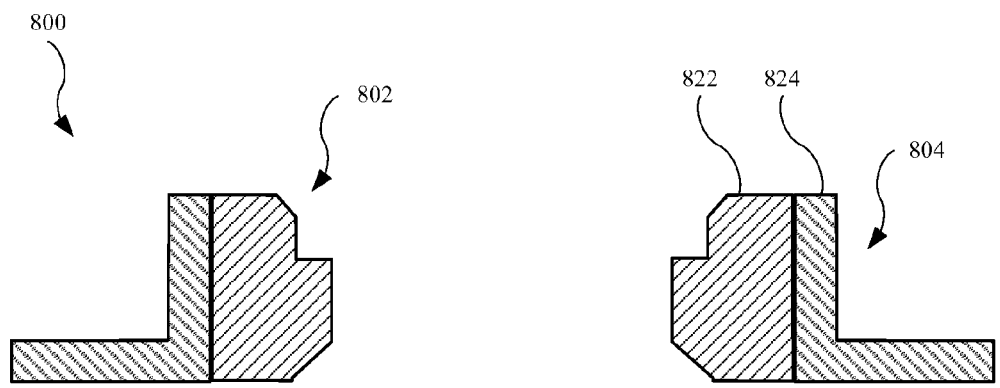
FIG. 21 illustrates a cross sectional view of the shield feature shown in FIG. 20 taken along line 21-21.

FIG. 21 illustrates a cross sectional view of the shield feature 800 shown in FIG. 20 taken along line 21-21. As shown, the electrically conductive region 802 includes several contoured regions designed to include a shape generally similar to that of a protruding feature (such as the first protruding feature 732, shown in FIG. 19). This allows for a close form fit between the electrically conductive region 802 and the (metal) protruding feature. Further, the electrically conductive region 802 may be formed from a material or materials that is/are compliant in order to further increase the form fit between the electrically conductive region 802 and a protruding feature. Also, a top portion 822 of the electrically conductive region 802 may be approximately co-planar, or flush, with respect to a top portion 824 of the non-electrically conductive region 804. In this manner, an internal component can readily be in electrical contact with the electrically conductive region 802 and the electrically conductive region 802 can define a portion of an electrically grounding pathway for the internal component. This will be shown below.

Figure 22:
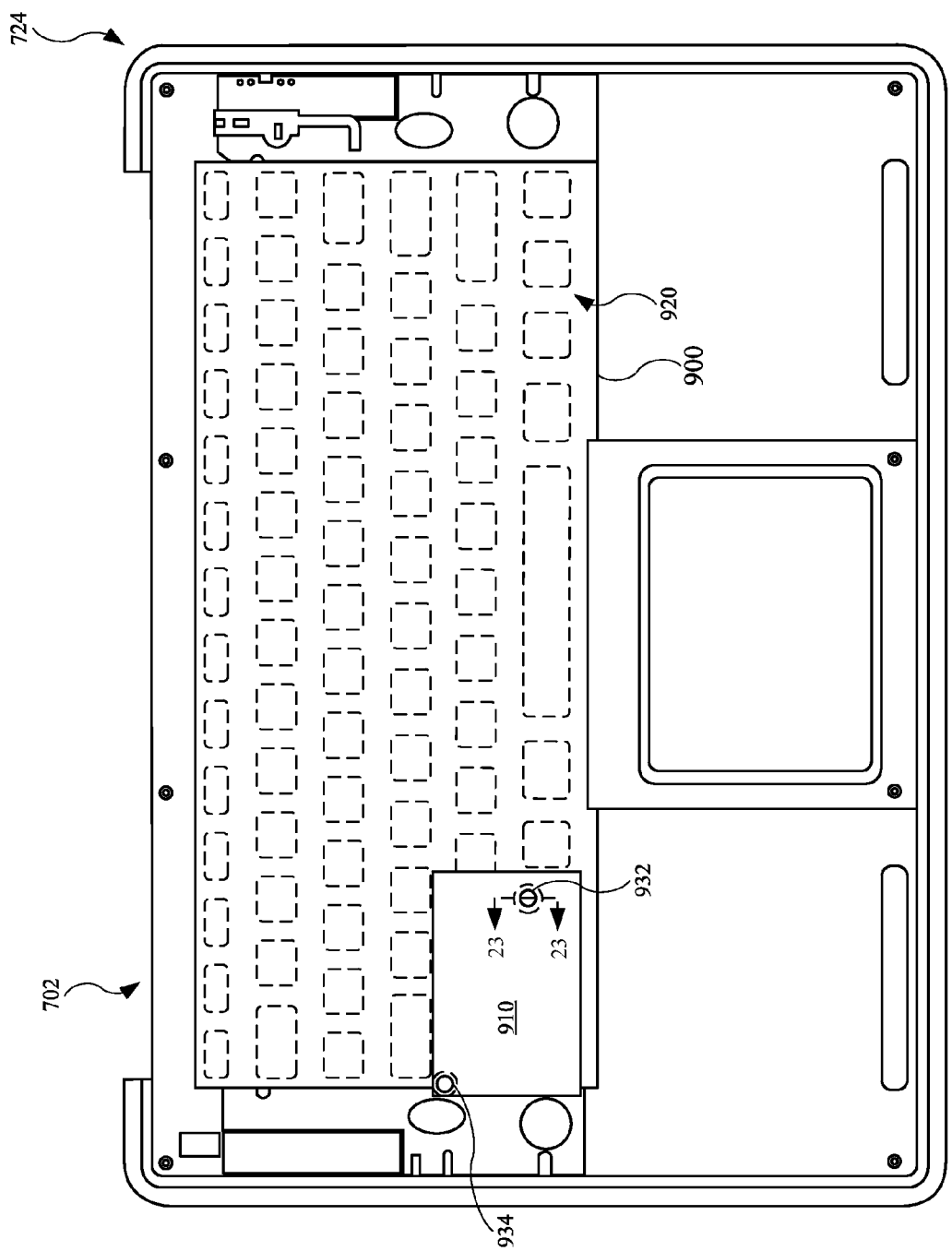
FIG. 22 illustrates a plan view of the interior region of the top case shown in FIG. 19, with a radio frequency (RF) shield disposed within the interior region.

FIG. 22 illustrates a plan view of the interior region 702 of the top case 724 shown in FIG. 19, with an RF shield 900 disposed within the interior region 702. As shown, the RF shield 900 is disposed between an internal component 910 and a keyboard assembly 920. Also, the internal component 910 is secured with the top case 724 via a first fastener 932 and a second fastener 934, with the first fastener 932 and the second fastener 934 extending through the first internal region 742 and the second internal region 744 (shown in FIG. 19), respectively. In some embodiments, the internal component 910 is an integrated circuit, such as a main logic board. The RF shield 900 is designed to shield the keyboard assembly 920 and/or other components from electromagnetic radiation generated by the internal component 910. When the RF shield 900 includes openings designed to receive, for example, the first protruding feature 732 and the second protruding feature 734, the RF shield 900 may be ineffective in shielding electromagnetic radiation in locations corresponding to the openings. However, when a shield feature, such as the shield feature 800 shown in FIG. 20, is disposed around the protruding features designed to receive the internal component 910, the electromagnetic radiation generated from the internal component 910 may be prevented, or substantially blocked, from extending to components associated with the keyboard assembly 920 and/or other components, and the keyboard assembly 920 and/or other components may achieve its desired functionality without electromagnetic interference.

Figure 23:
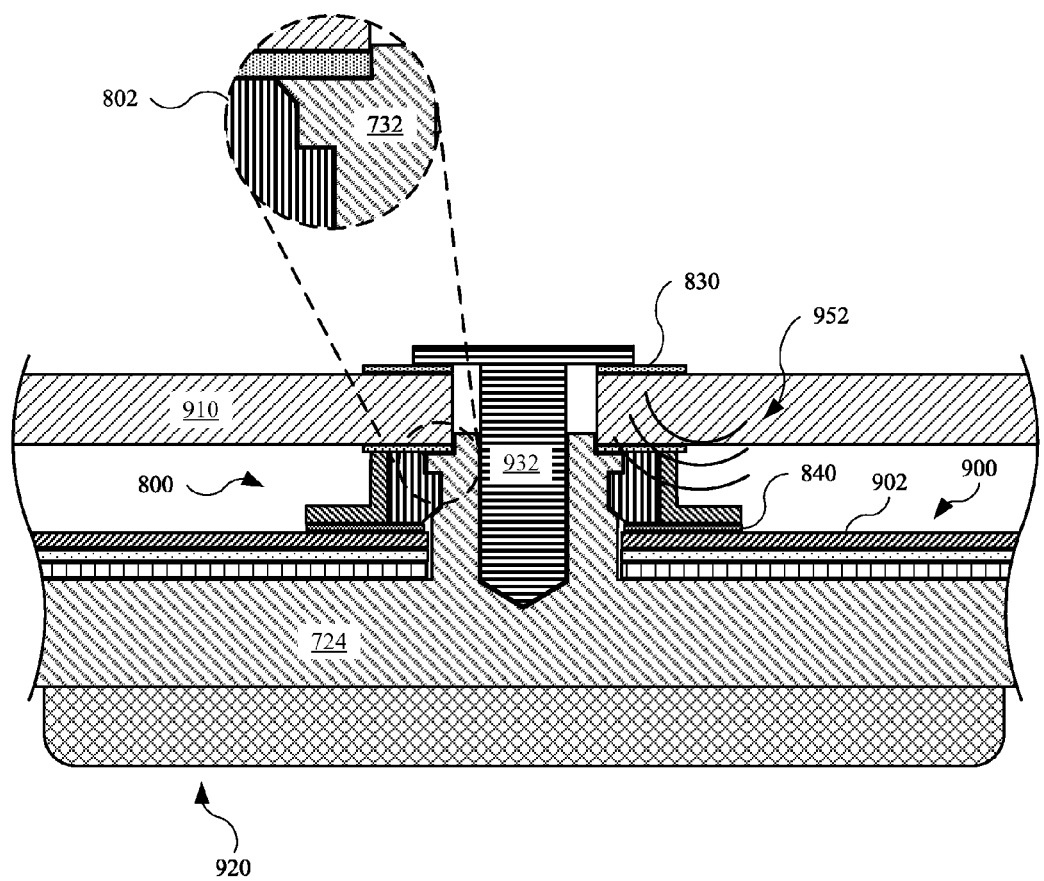
FIG. 23 illustrates a cross sectional view of the top case shown in FIG. 22 taken along line 23-23.

FIG. 23 illustrates a cross sectional view of the top case 724 shown in FIG. 22 taken along line 23-23. As shown, the first fastener 932 is secured with the first protruding feature 732 to secure the internal component 910 with the top case 724. Also, an electrical grounding pad 830 may be disposed between the first fastener 932 and the internal component 910. Also, the shield feature 800 is secured with the RF shield 900, defined by several layers, via an adhesive layer 840. In some embodiments, the adhesive layer 840 is an electrically conductive adhesive. Further, as shown in the enlarged view, the electrically conductive region 802 of the shield feature 800 includes a contoured region designed to leave minimal space between the first protruding feature 732 of the top case 724 and the electrically conductive region 802. In this manner, electromagnetic radiation 952 emitted from the internal component 910 is prevented, or substantially limited, from extending through the opening of the RF shield 900.

Also, in some embodiments, the RF shield 900 includes a first layer 902. In some embodiments, the first layer 902 is an electrically conductive layer. In this manner, an electrically grounding pathway for the internal component 910 may be defined in part by the electrical grounding pad 830, the electrically conductive region 802 of the shield feature 800, the adhesive layer 840, and the first layer 902. Accordingly, the shield feature 800 can be used not only as an electromagnetic radiation shield for a keyboard assembly 920, but also as an electrical grounding feature for an internal component 910.

Figure 24:
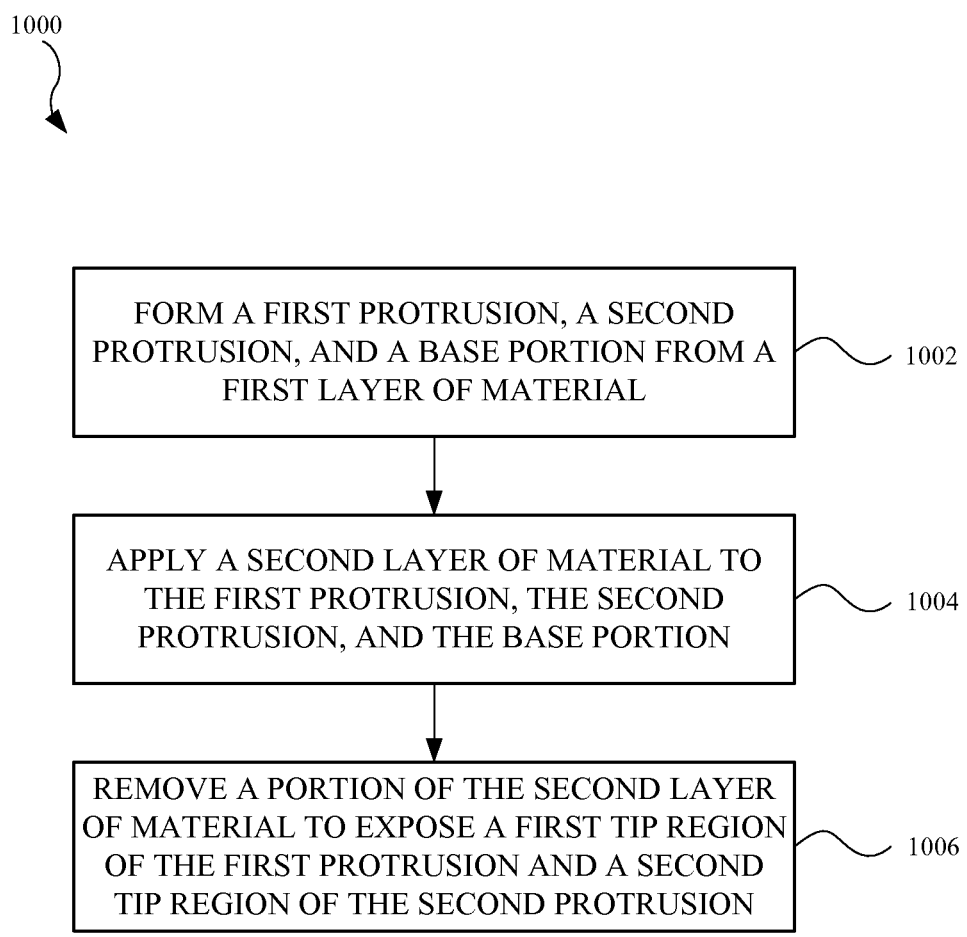
FIG. 24 illustrates a flowchart showing a method for forming a shield feature suitable for preventing electromagnetic radiation from interfering with an internal component of an electronic device, in accordance with the described embodiments.

FIG. 24 illustrates a flowchart 1000 showing method for forming a shield feature suitable for preventing electromagnetic radiation from interfering with an internal component of an electronic device, in accordance with the described embodiments. In step 1002, a first protrusion, a second protrusion, and a base portion are formed from a first layer of material. In some embodiments, the first layer of material is an electrically conductive material, such as an electrically conductive silicone. Also, in some embodiments, forming the first protrusion, the second protrusion, and the base portion includes molding, such as using a mold cavity or an injection molding apparatus. Also, a pitch may separate the first protrusion and the second protrusion. The pitch may be a distance substantially less than a wavelength of the electromagnetic radiation.

In step 1004, a second layer of material is applied to the first protrusion, the second protrusion, and the base portion. In some embodiments, the second layer of material is molded over the first protrusion, the second protrusion, and the base portion. In other embodiments, the second layer of material is sprayed over the first protrusion, the second protrusion, and the base portion. Also, in some embodiments, the second layer of material is formed from a non-electrically conductive material, such as a non-electrically conductive silicone. Also, the second layer of material may include a dark, or black, color.

In step 1006, a portion of the second layer of material is removed to expose a first tip region of the first protrusion and a second tip region of the second protrusion. The first tip region and the second tip region are formed from the first layer of material, and accordingly, may include an electrically conductive material. The removal means may include masking each tip regions with a mask prior to applying the second layer of material, followed by removing the masks after applying the second layer of material. Alternately, or in combination, a laser tool can perform a laser ablation to the tip regions to remove the second layer of material. Also, the laser tool can laser ablate additional material of the second layer to define exposed regions surrounding the tip regions.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device, comprising:
an electrically conductive enclosure that includes a top case and a bottom case;
an antenna; and
a shield feature that shields the antenna from electromagnetic radiation generated by an internal component of the electronic device, the shield feature formed from an electrically conductive material and comprising:
a base portion,
a first protrusion extending from the base portion, and
a second protrusion extending from the base portion and separated from the first protrusion by a gap that is less than a characteristic wavelength of the electromagnetic radiation, wherein the first protrusion and the second protrusion are formed at a first angle with respect to the base portion, and wherein the top case combines with the bottom case to engage and compress the first protrusion and the second protrusion to a second angle less than the first angle.

2. The electronic device of claim 1, further comprising a non-electrically conductive material surrounding a portion of the electrically conductive material.

3. The electronic device of claim 1, wherein the first protrusion includes a first tip region formed from the electrically conductive material, and wherein the second protrusion includes a second tip region formed from the electrically conductive material.

4. The electronic device of claim 1, wherein the
top case includes a recessed region, and
wherein the shield feature is disposed at least partially within the recessed region.

5. The electronic device of claim 1, wherein:
the first protrusion includes a first hollow region,
the second protrusion includes a second hollow region, and
the first hollow region and the second hollow region allow the first protrusion and the second protrusion, respectively, to reduce to the second angle.

6. The electronic device of claim 1, further comprising a cover, wherein the antenna is disposed the cover to hide the antenna.

7. The electronic device of claim 1, wherein the first protrusion and the second protrusion are configured to bend and at least partially disengage with the bottom case.

8. A shield feature for preventing transmission of electromagnetic radiation, the shield feature comprising:
a first layer comprising an electrically conductive material, the first layer including:
a first protrusion that includes a first tip region, and
a second protrusion that includes a second tip region, wherein the second protrusion is separated from the first protrusion by a distance less than a wavelength of the electromagnetic radiation; and
a second layer covering the first protrusion except for the first tip region, the second layer further covering the second protrusion except for the second tip region.

9. The shield feature of claim 8, wherein the second layer comprises a non-electrically conductive layer.

10. The shield feature of claim 9, wherein the first protrusion comprises a conical shape and a hollow region that defines a first angle of the conical shape, and wherein the first tip region receives a force causing the conical shape to reduce from the first angle to a second angle less than the first angle.

11. The shield feature of claim 10, wherein the first layer includes an electrically conductive silicone, and wherein the second layer includes a non-electrically conductive silicone.

12. The shield feature of claim 11, further comprising an adhesive layer, wherein the first layer includes a first extension and a second extension, and wherein the first extension and the second extension extend beyond the adhesive layer to engage an enclosure of an electronic device.

13. The shield feature of claim 8, wherein the first tip region, the second tip region, and a portion of the first layer extend beyond the second layer to engage an enclosure of an electronic device.

14. The shield feature of claim 8, wherein the first layer includes a base portion that surrounds the first protrusion and the second protrusion.

15. A method for forming a shield feature suitable for preventing electromagnetic radiation, the method comprising:
forming a first protrusion having a first tip region and a second protrusion having a second tip region from a first layer that includes an electrically conductive material, the second protrusion separated from the first protrusion by a distance less than a wavelength of the electromagnetic radiation; and
applying a second layer to the first protrusion and the second protrusion, the second layer including a non-electrically conductive material that covers (i) the first protrusion except for the first tip region and (ii) the second protrusion except for the second tip region.

16. The method of claim 15, further comprising securing an adhesive layer with at least the first layer.

17. The method of claim 15, further comprising laser ablating the second layer in a location below the first tip region and the second tip region.

18. The method of claim 15, wherein forming the first protrusion and the second protrusion comprises separating the first protrusion from the second protrusion by a distance less than a wavelength of the electromagnetic radiation.

19. The method of claim 15, wherein forming the first protrusion comprises forming a protrusion having a conical shape and a hollow region.

* * * * *